(12) United States Patent
Lau

(10) Patent No.: US 10,694,800 B2
(45) Date of Patent: Jun. 30, 2020

(54) METHOD OF MAKING A HEADWEAR AND THE HEADWEAR THEREOF

(71) Applicant: Royal Shiny (Hong Kong) Limited, Kowloon Bay (HK)

(72) Inventor: Ka Fai Edward Lau, Kowloon Bay (HK)

(73) Assignee: ROYAL SHINY (HONG KONG) LIMITED, Hong Kong (HK)

( * ) Notice: Subject to any disclaimer, the term of this patent is extended or adjusted under 35 U.S.C. 154(b) by 400 days.

(21) Appl. No.: 15/381,216

(22) Filed: Dec. 16, 2016

(65) Prior Publication Data
US 2017/0265552 A1 Sep. 21, 2017

(30) Foreign Application Priority Data
Mar. 15, 2016 (HK) .................................. 16103020.0

(51) Int. Cl.
*A42B 1/06* (2006.01)
*A42C 1/00* (2006.01)
(Continued)

(52) U.S. Cl.
CPC .............. *A42B 1/069* (2013.01); *A42B 1/062* (2013.01); *A42C 1/00* (2013.01); *A42C 1/04* (2013.01);
(Continued)

(58) Field of Classification Search
CPC ........... A42B 1/062; A42B 1/069; A42C 1/00; A42C 1/04; B29C 43/18; B29C 43/52;
(Continued)

(56) References Cited

U.S. PATENT DOCUMENTS 2,112,384 A * 3/1938 Sloan ....................... A42C 1/04
2/175.9
2,746,049 A * 5/1956 Hudson .................. A42B 3/063
2/412
(Continued)

FOREIGN PATENT DOCUMENTS

CN 101317704 A 12/2008
CN 201609137 U 10/2010
(Continued)

OTHER PUBLICATIONS

Search Report from Chinese Patent Office dated Jul. 4, 2016, application No. 16103020.0 filed Mar. 15, 2016, 7 pages in total.
(Continued)

*Primary Examiner* — Anna K Kinsaul
(74) *Attorney, Agent, or Firm* — Ware, Fressola, Maguire & Barber LLP

(57) ABSTRACT

A manufacturing method including providing a mold including at least two mold parts having first and second molding surfaces which are complementarily profiled to give shape to headwear; shaping a first substrate in the mold resulting in the first substrate having a non-planar profile which matches at least a portion of the profile of the molding surfaces; shaping a second substrate in the mold resulting in the second substrate having a non-planar profile which matches the profile of the molding surfaces; overlaying the first substrate on the second substrate and matching their non-planar profile to form a combined substrate; placing a third substrate in the mold with the combined substrate, sandwiching the first substrate; and shaping the third substrate with the combined substrate in the mold resulting in the third substrate having a non-planar profile which matches the profile of the molding surfaces, thereby forming a seamless structure for the headwear.

31 Claims, 17 Drawing Sheets

(51) Int. Cl.
  *B29C 43/18* (2006.01)
  *A42C 1/04* (2006.01)
  *B29C 43/52* (2006.01)
  *B29C 65/08* (2006.01)
  *B29C 65/48* (2006.01)
  *B29K 23/00* (2006.01)
  *B29K 75/00* (2006.01)
  *B29K 105/04* (2006.01)
  *B29L 31/48* (2006.01)

(52) U.S. Cl.
  CPC .............. *B29C 43/18* (2013.01); *B29C 43/52* (2013.01); *B29C 65/08* (2013.01); *B29C 65/48* (2013.01); *B29K 2023/12* (2013.01); *B29K 2075/00* (2013.01); *B29K 2105/04* (2013.01); *B29L 2031/4814* (2013.01)

(58) Field of Classification Search
  CPC ..... B29C 65/08; B29C 65/48; B29K 2023/12; B29K 2075/00; B29K 2105/04; B29L 2031/4814
  See application file for complete search history.

(56) References Cited

U.S. PATENT DOCUMENTS

| | | | |
|---|---|---|---|
| 3,673,611 A | 7/1972 | Cain et al. | |
| 4,114,201 A * | 9/1978 | Garrison | A42B 1/062 2/209.7 |
| 6,129,250 A | 10/2000 | Cho | |
| 2009/0199320 A1* | 8/2009 | Ng | A42C 1/04 2/209.3 |
| 2015/0096104 A1 | 4/2015 | Kim | |

FOREIGN PATENT DOCUMENTS

| | | |
|---|---|---|
| CN | 102742957 A | 10/2012 |
| CN | 204378019 U | 6/2015 |
| DE | 9311632 U1 | 9/1994 |
| EP | 2910138 A1 | 8/2015 |
| FR | 1557355 A | 2/1969 |
| GB | 15993 A | 1/1912 |
| NL | 6803963 A | 9/1968 |
| WO | 2004026060 A2 | 4/2004 |

OTHER PUBLICATIONS

European Search Report Application No. EP 17 15 2501 Completed: Jun. 26, 2017; dated Jul. 11, 2017 7 pages.
Machine Translation, DE 9311632 U1, 9 pages.
English language abstract for Foreign Patent Document Cite No. 2, CN102742957A, 2 pages.
English language abstract for Foreign Patent Document Cite No. 3, CN201609137A, 1 page.
English language abstract for Foreign Patent Document Cite No. 4, CN101317704A, 2 pages.
English language abstract for Foreign Patent Document Cite No. 2, CN204378019U, 2 pages.
English translation of p. 3 of previously submitted Search Report from Chinese Patent Office dated Jul. 4, 2016, application No. 16103020.0 filed Mar. 15, 2016, 1 page.
English language abstract for Foreign Patent Document Cite No. 7, EP2910138A1, previously submitted with IDS filed Sep. 5, 2017, 1 page.

* cited by examiner

METHOD OF MAKING A HEADWEAR AND THE HEADWEAR THEREOF

The present invention relates to a method of making a headwear, for example particularly, but not exclusively, by way of heat press; and the headwear thereof.

BACKGROUND OF THE INVENTION

A headwear such as a cap has a soft fabric crown sewn of several sections of fabric and a visor that protects the eyes from the sun. Some special order caps are made to fit the wearer in specific sizes but most of them are products of mass production which has a plastic extender in the center back for adjustment to fit all.

The manufacturing of a cap for example is rather complicated and involves at least 10 steps. To demonstrate, a cap is a collective work of various departments in the line of production. To start with, the fabric layers are cut by fabric-cutting saw to form panels. Mesh acting as a stiffener is put against the back of the panels before the panels are sewn to one another. The sections of the soft crown, generally of long triangular shaped gores are sent to the eyelet department where a machine pierces each panel creating a small hole. The holes are bound completely with thread. Front panels of the cap are sent to the embroidery department to receive embroidery. A computer driven embroidery machine embroiders a logo or an entire word onto one or two of the front panels. Some logos require 31,000 stitches. The panels of the crown, generally either six or eight panels are then sent to the sewing department where they are stitched together. With stiffening and logo, these panels are heavy to sew through. It requires human skill with industrial grade sewing machine to sew the panels together. The beanie is then sent to the binders or the binding department where the raw seams of the soft crown are covered or hidden. A binding tape may be applied over the raw edges of the crown to conceal them. This tape gives the hat a finished look. A self-covered galvanized steel button is placed at the dead center of the cap on top of the beanie crown where all the sections of the cap converge.

The visors are formed from layers of material and usually include a stiffener. The base panels are die-cut to the desired size and then sewed onto the cap. Stiffeners may be placed between the two panels to stiffen the visor. Thereafter an adjustable plastic band may be provided at the back of the cap. Finally a sweatband of some sort is sewn onto the inside of the cap. Further steps may be added to produce a preferred product. For example, some may steam the finished product to ensure the durability. Some may stitch along different edges to avoid curling.

These steps are specific to a baseball cap. Different settings are required for making different types of headwear. Re-organizing the factory to provide the required settings is time consuming and costly. Special machines may be required to produce certain types of headwear. It may not be economical to invest in such a machine if the demand is small. As such handmade headwear is still indispensable and available at a premium.

The invention seeks to eliminate or at least to mitigate such shortcomings by providing a new or otherwise improved method of manufacturing a headwear.

SUMMARY OF THE INVENTION

According to the invention, there is provided a manufacturing method of manufacturing a headwear, comprising the steps, irrespective of order, of (a) providing a moldmold including at least two moldmold parts having first and second moldmolding surfaces which are complementarily profiled to give shape to said headwear; (b) shaping a first substrate in the moldmold resulting in the first substrate having a non-planar profile which matches at least a portion of the profile of the moldmolding surfaces;
(c) shaping a second substrate in the moldmold resulting in the second substrate having a non-planar profile which matches the profile of the moldmolding surfaces;
(d) overlaying the first substrate on the second substrate and matching their non-planar profile to form a combined substrate;
(e) placing a third substrate in the moldmold with the combined substrate, sandwiching the first substrate; and
(f) shaping the third substrate with the combined substrate in the moldmold resulting in the third substrate having a non-planar profile which matches the profile of the moldmolding surfaces, thereby forming a seamless structure for said headwear.

Preferably, the portion of the non-planar profile comprises two surfaces interfaced by a bent.

More preferably, the bent comprises a fold line.

Yet more preferably, the two surfaces are curved surfaces.

It is preferable that the first and second substrate include corresponding bent after shaping and the bents are matched when the second substrate which overlays the first substrate to form the bent of the combined substrate.

Preferably, in step (f), the third substrate is shaped to include a bent that correspond to the bent of the combined substrate.

Advantageously, the first substrate is sandwiched between the second and third substrates with the bents matching for reinforcement.

More advantageously, the first substrate has a higher deformation resistance than the second and third substrates to function as a supportive structure therebetween.

More preferably, the second substrate forms a loop structure in step (c).

It is advantageous that the one-piece headwear structure forms a loop in step (f).

Preferably, the seamless headwear structure has free ends that are held together by a solid-state weld.

More preferably, the seamless headwear structure has free ends that are held together through an adjustable link.

It is preferable that the seamless headwear structure is a lamination with the substrates held together at least partially by a solid-state weld.

Advantageously, the seamless headwear structure is a lamination with the substrates held together at least partially by a binding agent.

More advantageously, the binding agent comprise an adhesive.

It is preferable that the method further comprising a step of fusing a raw edge of the seamless headwear structure by a solid-state weld after step (f).

Preferably, the step (g) is conducted by way of ultrasonic welding.

It is advantageous that the method further comprising the step of trimming a shaped first substrate into a desirable contour.

It is preferable that the method further comprising the step of trimming a shaped second substrate into a desirable contour.

It is advantageous that the method further comprising the step of trimming a shaped third substrate into a desirable contour.

Preferably the method further comprising the step of trimming a shaped seamless headwear structure into a desirable contour.

Advantageously the method comprising the step of trimming includes simultaneously trimming and fusing of a trimmed edge of the shaped seamless headwear structure.

Preferably, the machine is a heat press machine.

More preferably, the step of trimming and fusing is conducted by way of an ultrasonic cutter.

Yet more preferably, the moldmold comprises a metal moldmold.

Advantageously, the first substrate comprises foam.

Yet more advantageously, the foam comprises polypropylene and polyurethane.

It is preferable that the moldmold useful in shaping the first, second and third substrates is a same moldmold.

It is advantageous that the moldmold remains in the closed position for 150 to 200 seconds in each of steps (b), (c) and (f).

Preferably, each layer of substrate is a seamless non-planar structure.

More preferably, the non-planar profile of step (c) includes a portion of the non-planar profile of step (b).

Yet more preferably, the non-planar profile of step (c) has a periphery that encloses and surrounds the non-planar profile of step (b).

In another aspect of the invention, there is provided a manufacturing method of making a headwear, comprising the steps of (a) providing a moldmold including at least two moldmold parts having first and second moldmolding surfaces which are complementarily profiled to give shape to said headwear;
(b) shaping a first substrate in the moldmold resulting in the first substrate having a non-planar profile which matches at least a portion of the profile of the moldmolding surfaces; (c) trimming the first substrate to a desired profile;
(d) shaping a second substrate in the moldmold resulting in the second substrate having a non-planar profile which matches the profile of the moldmolding surfaces, including the portion mentioned in step (b);
(e) overlaying trimmed first substrate on the second substrate and matching their non-planar profile to form a combined substrate;
(f) placing a third substrate in the moldmold with the combined substrate to sandwich the first substrate;
(g) shaping the third substrate with the combined substrate in the moldmold resulting in the third substrate having a non-planar profile which matches the profile of the moldmolding surfaces; and
(h) trimming the second and third substrates simultaneously to thereby forming a seamless headwear structure.

Preferably, the headwear is a hat.

In another aspect of the invention there is provided a seamless headwear manufactured by the method as mentioned above.

In a further aspect of the invention there is provide a hat comprising a laminated body which has a non-planar profile with a seamless finish.

Preferably, the laminated body includes a layer of supportive structure (skeleton) for reinforcing shape of each layer of substrates.

More preferably, the laminated body includes at least two portions joined by a bent.

Yet more preferably, the bent comprises a fold line.

More advantageously, the two portions include a looped strap and a visor interfaced by the bent.

Yet more advantageously, the laminated body has at least two free ends joined by an adjustable link to form a loop.

Preferably, each layer of substrate is a seamless non-planar structure.

BRIEF DESCRIPTION OF DRAWINGS

The invention will now be more particularly described, by way of example only, with reference to the accompanying drawings, in which.

DETAILED DESCRIPTION OF PREFERRED EMBODIMENT

Figure 1:
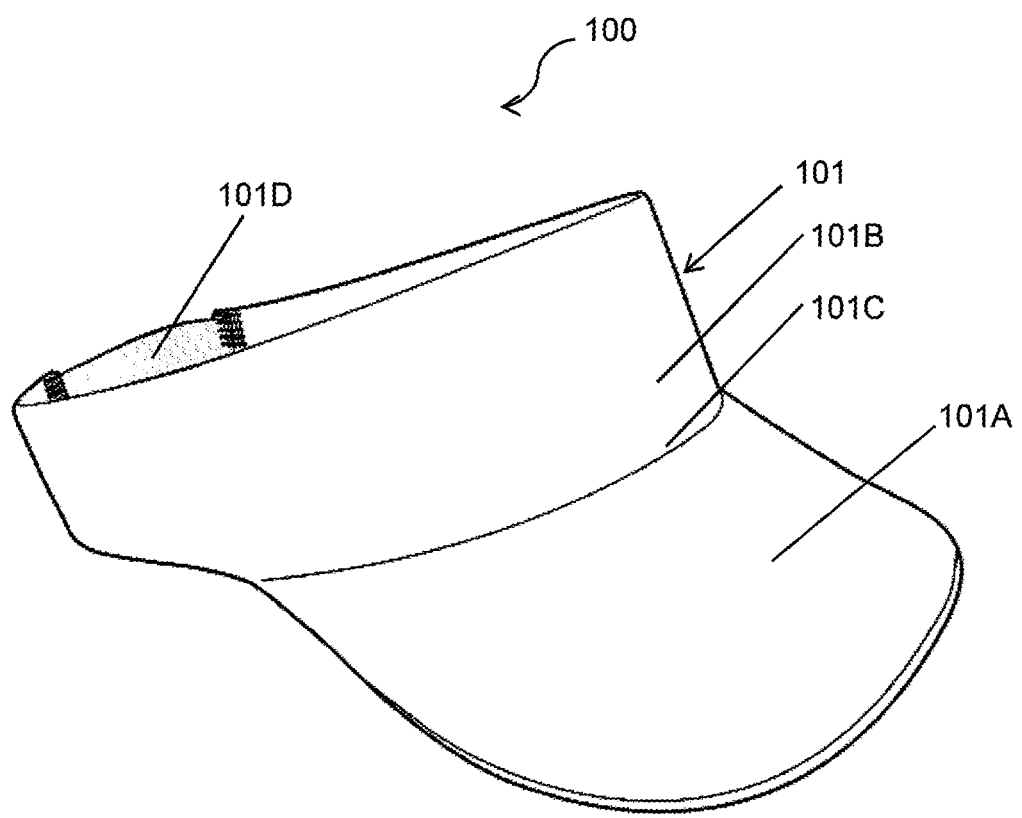
FIG. 1 is a perspective view of an embodiment of a headwear in accordance with an aspect of the invention.
Figure 2A:
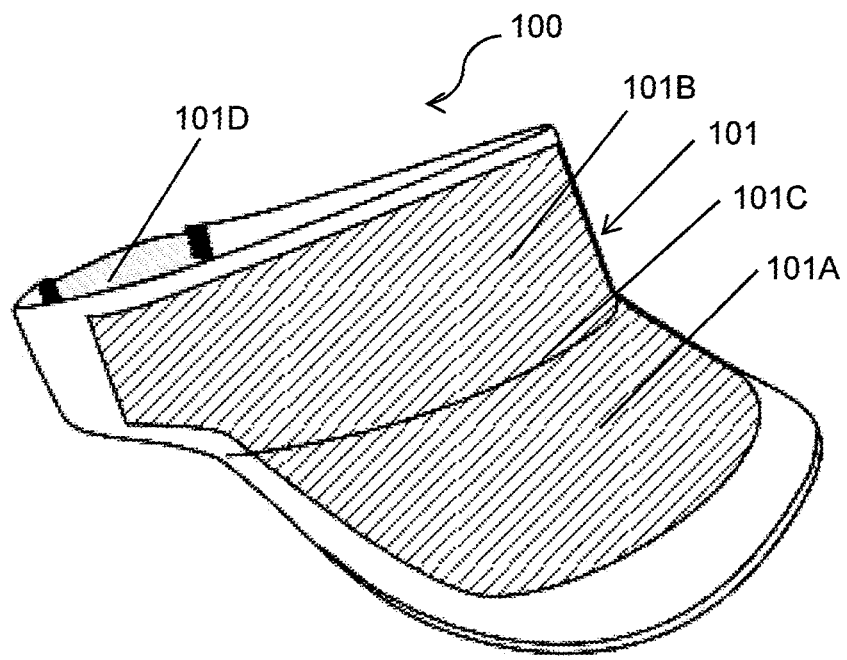
FIG. 2A is an illustrative perspective view of the headwear in FIG. 1 showing the position of a first substrate.
Figure 2B:
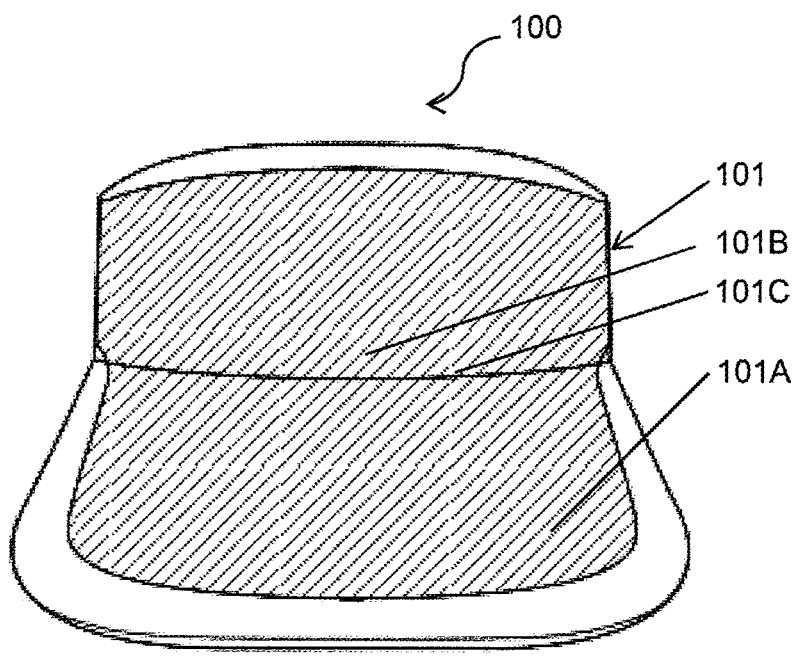
FIG. 2B is an illustrative front view of the headwear in FIG. 2A.
Figure 3:
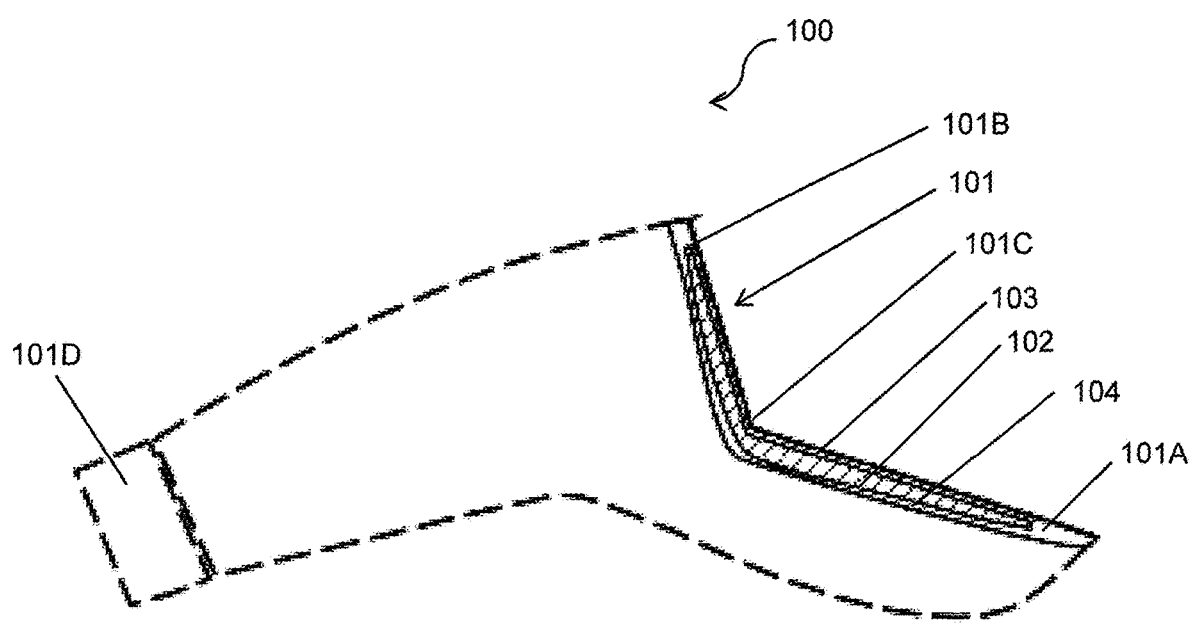
FIG. 3 is an illustrative cross-sectional view of the headwear in FIGS. 2A and 2B showing the first substrate being sandwiched between second and third substrates.

Referring to FIGS. 1 to 3 of the drawings, there is shown a headwear 100 in the form of a visor cap. The visor cap 100 includes a body 101. The body 101 includes a visor portion 101A and a headband portion 101B interfaced by a bent 101C. In the preferred embodiment, the bent 101C is in the form of a fold line. The headband portion 101B includes two free ends that may be connected by a link 101D. The link 101D is an adjustable link preferably in the form of an elastic band sewed to the free ends. It is of course possible for the headwear 100 to include a headband portion 101B without free ends and in the form of a complete loop that is useful in looping around a user's head. In that case, the overall headwear 100 is seamless.

As can be seen in FIGS. 2A to 3, the body 101 is a lamination of two or more, in this case three, layers of substrates 102-104 that forms a seamless one-piece headwear structure with a preferred non-planar profile. In more detail, a first substrate 102 is sandwiched between second and third substrates 103 and 104. The first substrate 102 has higher deformation resistance when compared to the second and third substrates 103 and 104 to function as a supportive structure for reinforcing in particular the shape of the bent 101C, the visor portion 101A and the headband portion 101B. The supportive structure runs inside the visor cap 100 as skeleton. This will be explained further down.

The first substrate 102 is preferably a foam made from 68% Polypropylene and 32% Polyurethane and may be covered by a layer of textile after the foam is formed before it is used for the manufacturing of the subject headwear 100. The second and third substrates 103 and 104 are usually formed from the same type of material overlaying and enclosing the first substrate 102. The second and third substrates 103 and 104 are formed from the same type of material overlaying with textile. The non-planar profile of the second or third substrates 103 or 104 has a periphery that encloses and surrounds the non-planar profile of the first substrate 102.

Figure 4:
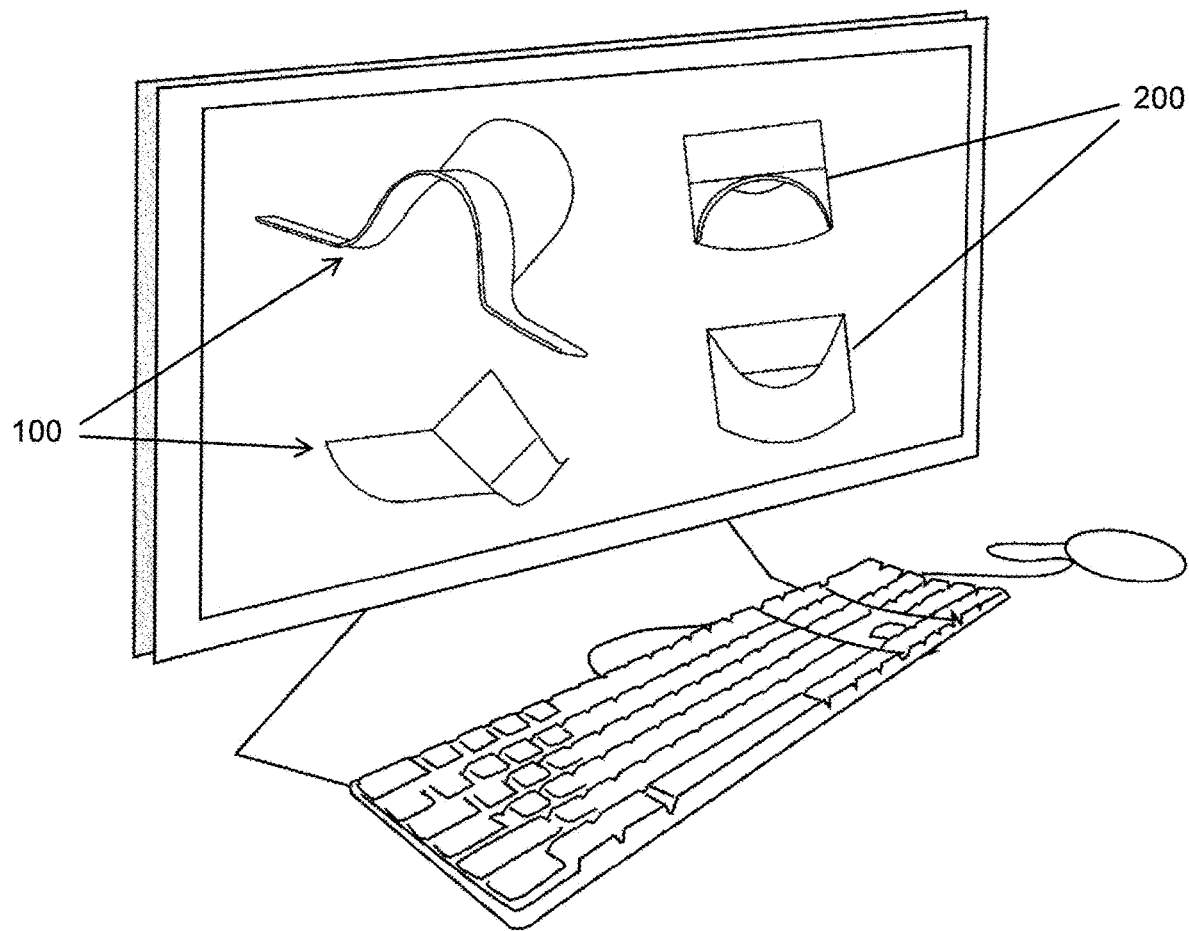
FIG. 4 is an illustrative perspective view of a computer device designing a shape of the headwear in FIG. 1.

Referring to FIG. 4, the shape of the headwear 100 is designed by conventional software. A mold 200 is formed to provide the shape to substrates 102-104 useful in making the headwear 100. This mold 200 is removably installed to the machine which is preferably a hot press machine that applies heat and pressure to the substrate 102, 103 or 104 for shaping.

Figure 5:
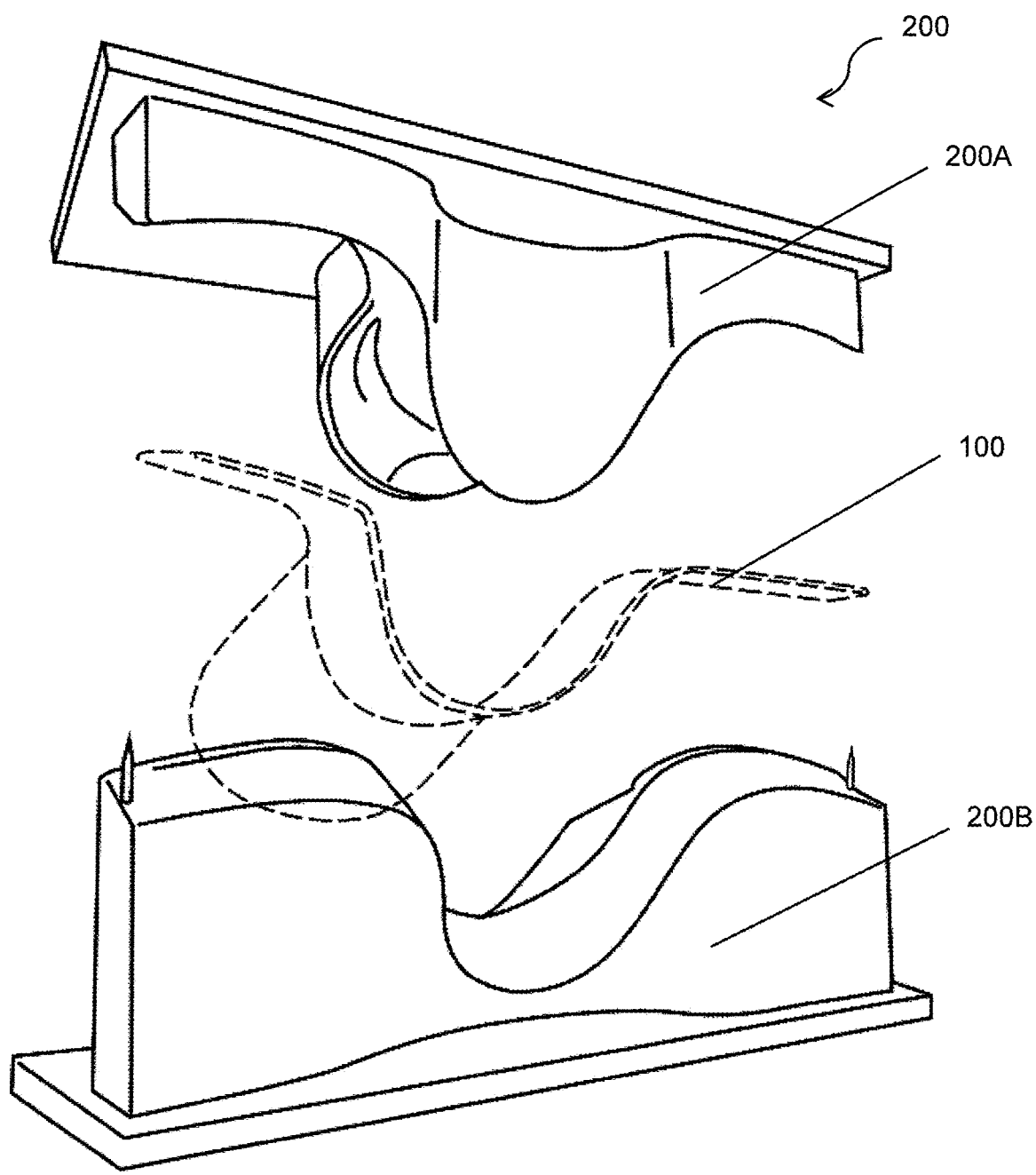
FIG. 5 is an illustrative perspective view of a moldmold for making the headwear in FIG. 1.
Figure 6:
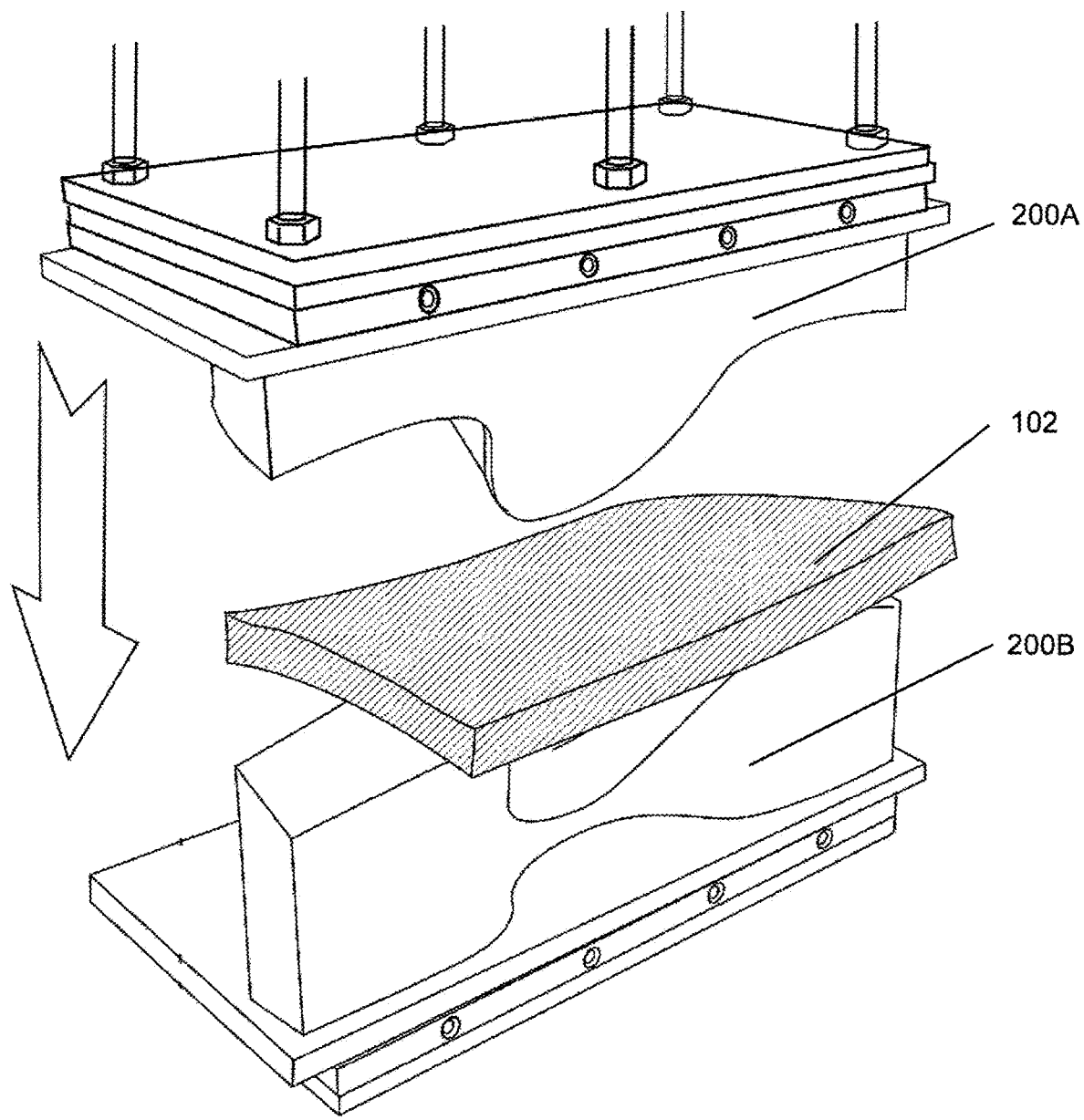
FIG. 6 is an illustrative drawing showing a step of placing the first substrate in the moldmold in a process of manufacturing the headwear in FIG. 1 according to another aspect of the invention.
Figure 7:
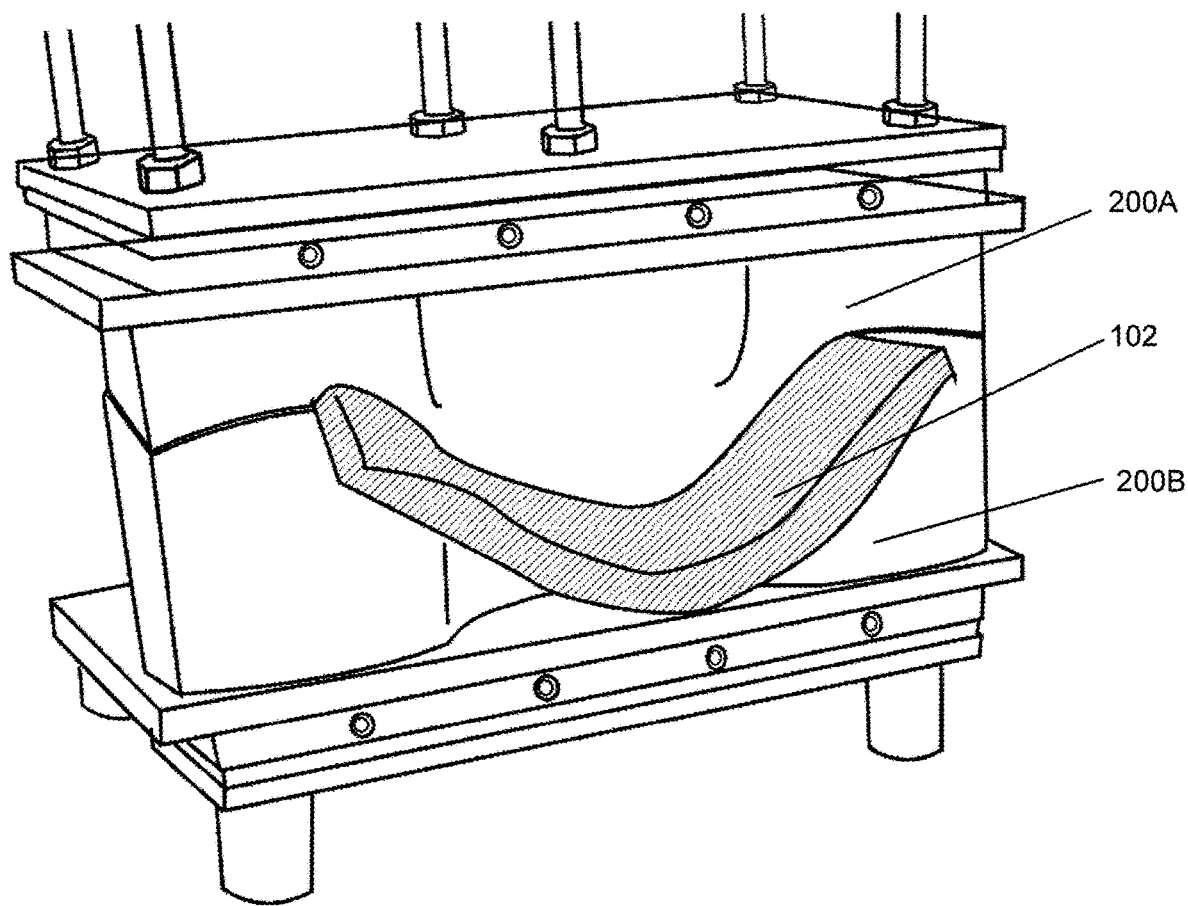
FIG. 7 is an illustrative drawing showing a further step of moldmolding the first substrate in FIG. 6.
Figure 8A:
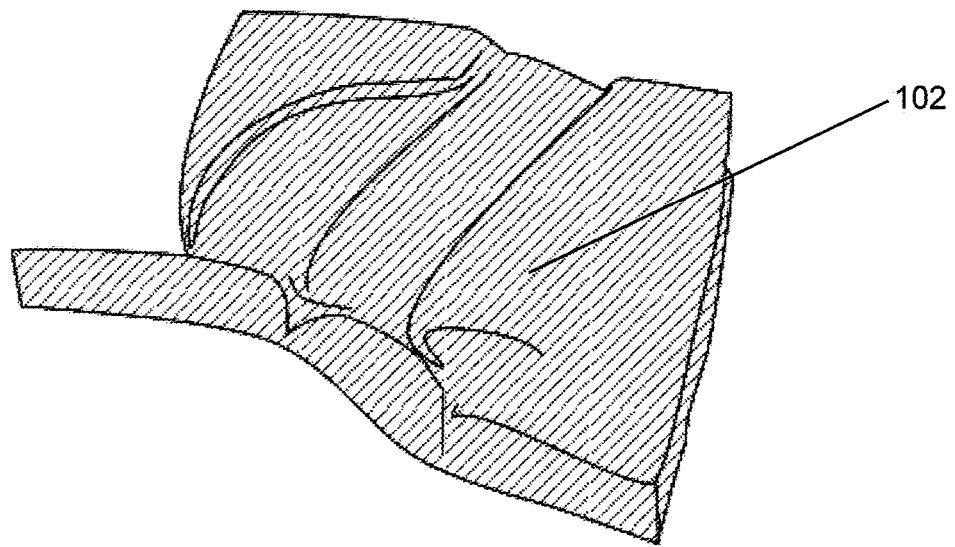
FIG. 8A is an illustrative perspective view of a moldmolded first substrate in FIG. 7.
Figure 8B:
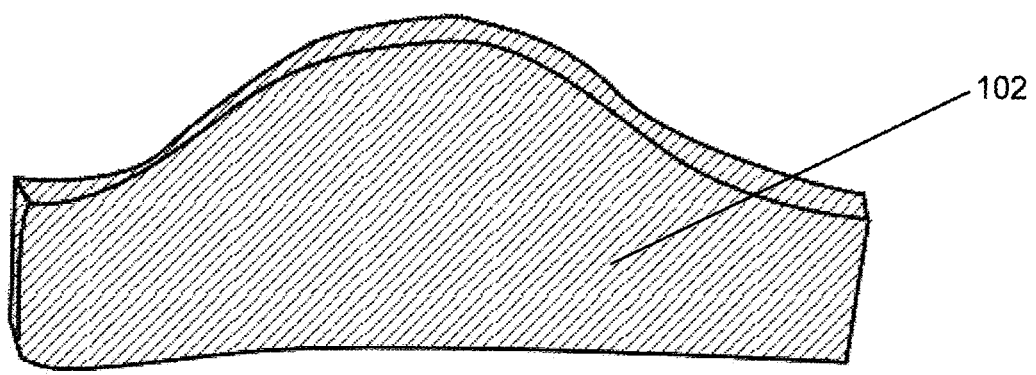
FIG. 8B is a side view of the moldmolded first substrate in FIG. 8A.

FIG. 5 shows a mold 200 with at least two mold parts 200A and 200B having first and second molding surfaces which are complementarily profiled to give shape to the headwear 100. The shape of each portion of the headwear 100 is produced simultaneously across each layer of substrate 102, 103 or 104 by way of a single step of hot press using the same mold 200. The resulting shaped substrate 102, 103 or 104 is seamless. Referring to FIG. 6, the two mold parts 200A and 200B are opened to permit insertion or placing of a first substrate 102 onto the lower mold part 200B. Once the first substrate 102 is in place, the upper mold part 200A is lowered to press against the lower mold part 200B with the first substrate 102 in between. At this stage, the mold parts 200A and 200B may be considered closed. The applied heat and the pressure melts the substrate 102 which is allowed to re-set into and in accordance with the profile of the molding surfaces of the mold parts 200A and 200B. The mold parts 200A and 200B remain closed for about one hundred seconds as shown in FIG. 7. The heat applied is about 200° C. The shaping of the first substrate 102 in the mold 200 results in the first substrate 102 having a non-planar profile which matches at least a portion of the profile of the molding surfaces. The first substrate 102 does not cover the entire molding surfaces of the mold parts 200A and 200B as it is not intended to occupy the whole dimension of the headwear 100 (the first substrate covers less than all of the molding surfaces). It is only useful in part of the headwear 100 to provide structural support. FIGS. 8A and 8B show the shaped first substrate 102 which is trimmed to the desired shape and dimension.

Figure 9:
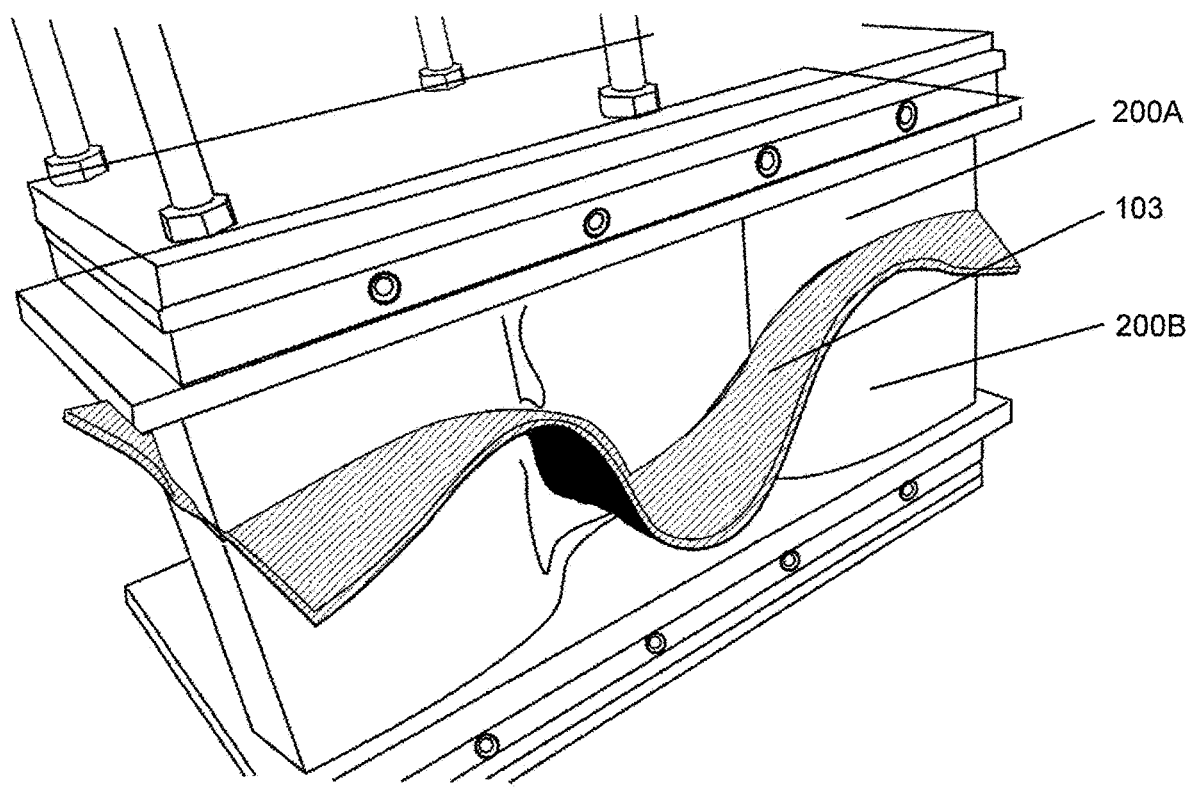
FIG. 9 is an illustrative drawing showing a step of molding a second substrate in the mold.
Figure 10:
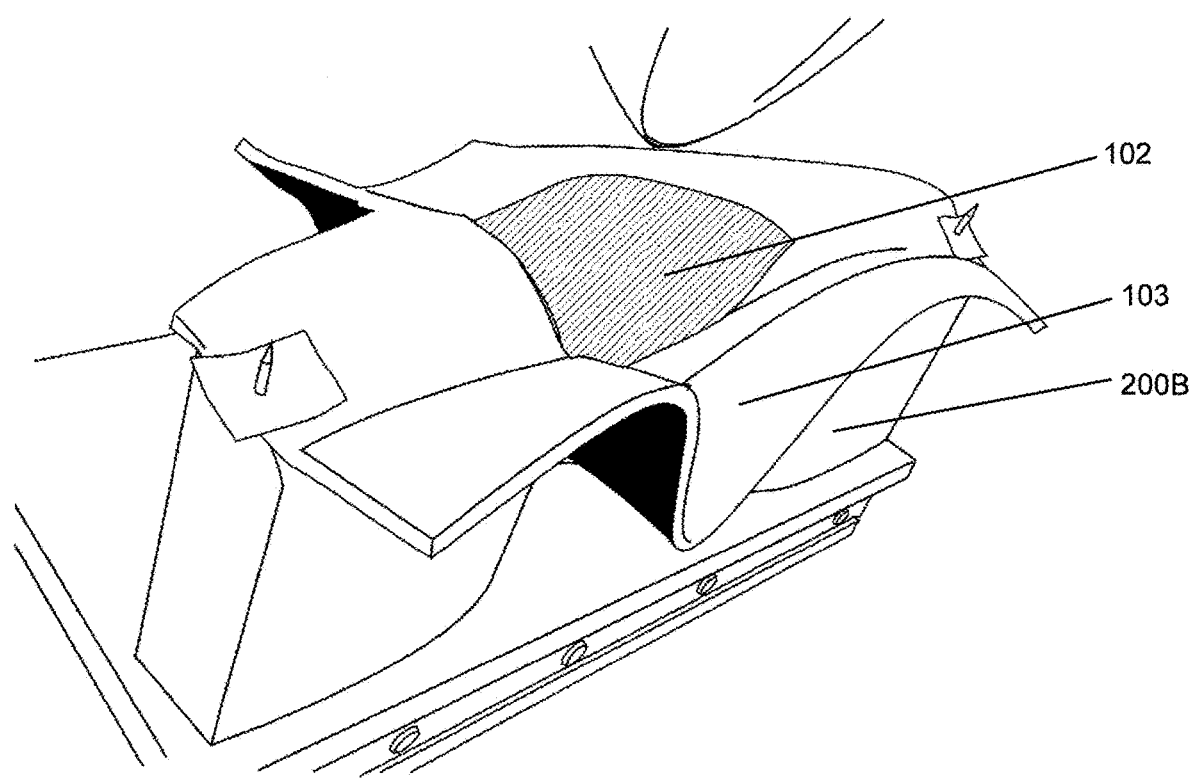
FIG. 10 is an illustrative drawing showing a step of placing the molded first substrate into a molded second substrate.

In this embodiment of the headwear 100, the headwear 100 is a lamination of three layers of substrates 102, 103 and 104. The middle layer comprises the first substrate 102. With reference to FIG. 9, to form an outer skin of the headwear 100, a second substrate 103 is placed on the lower mold part 200B. The mold parts 200A and 200B are closed to apply a temperature of 180° C. and remain closed for one hundred and twenty seconds to shape the second substrate 103. The shaping of the second substrate 103 in the mold results in the second substrate 103 having a non-planar profile that matches the profile of the molding surfaces. Once the shaping process of the second substrate 103 is over, the shaped second substrate 103 remains on the lower mold part 200B while the shaped and trimmed first substrate 102 is placed thereon. The second substrate basically covers the entire molding surfaces of the mold parts 200A and 200B, including the part which the first substrate 102 covered when it was molded. As such, when the shaped first substrate 102 is placed over the shaped second substrate 103, see FIG. 10, the shape of the shaped first substrate 102 corresponds to that of a part of the shaped second substrate 103 which requires structural reinforcement. By overlaying the shaped and trimmed first substrate 102 over the shaped second substrate 103 and by matching their non-planar profile, the two form a combined substrate.

Figure 11:
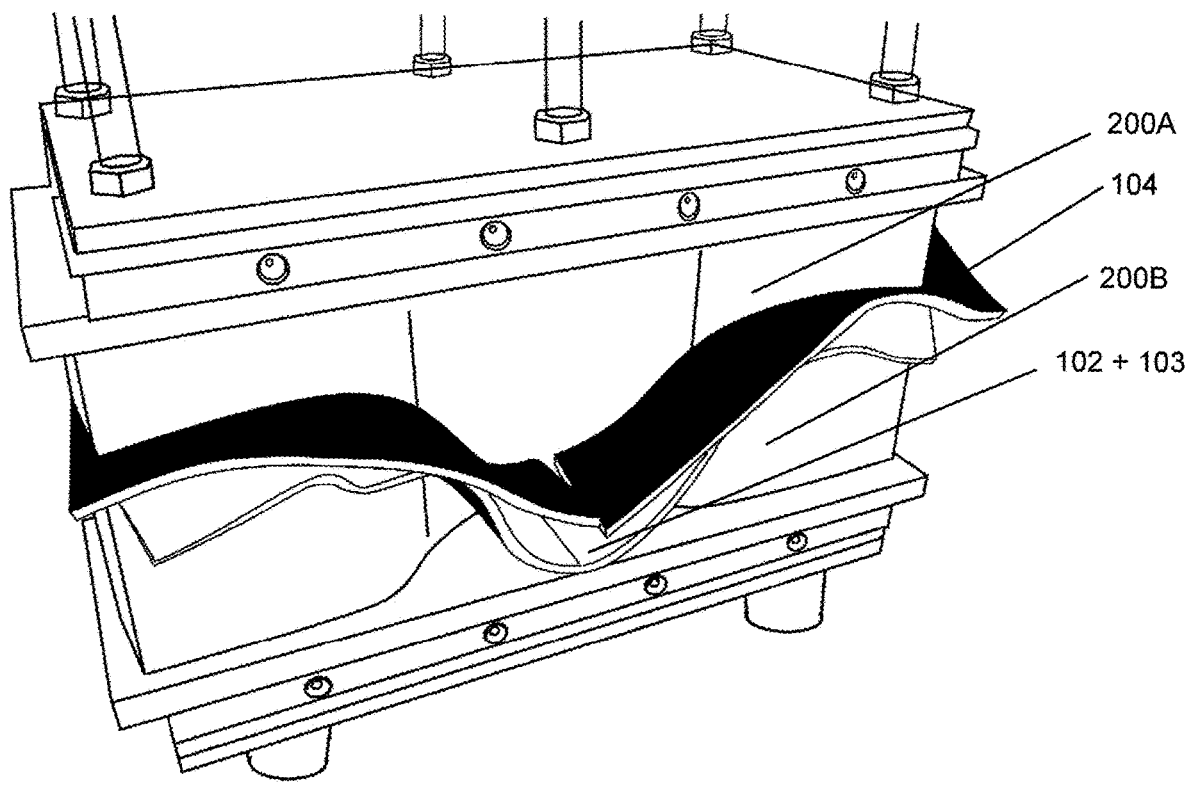
FIG. 11 is an illustrative drawing showing a step of molding a third substrate to the first and second substrates.
Figure 12:
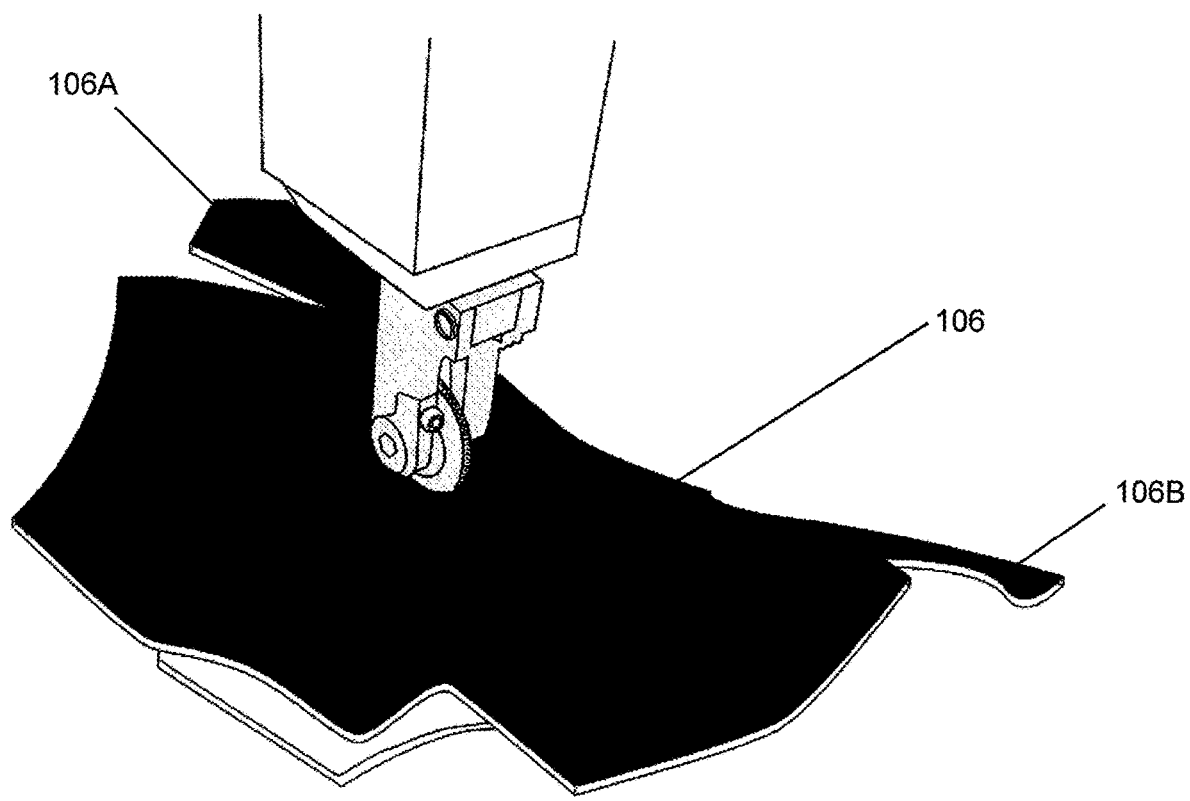
FIG. 12 is an illustrative drawing showing a step of trimming the molded first, second and third substrates.

As shown in FIG. 11, the third substrate 104 is placed over the combined substrate covering the entire molding surfaces of the mold parts 200A and 200B. When the mold parts 200A and 200B are closed, the shaping of the third substrate 104 with the combined substrate results in the third substrate 104 having a non-planar profile which matches the profile of the molding surfaces of the mold parts 200A and 200B. During hot press, the first, second and third substrates 102, 103 and 104 are bonded together wherever possible. The substrates 102, 103 and/or 104 are laminated or held together at least partially by a solid-state weld and then trimmed to the preferred shape and dimension. This forms a seamless headwear structure. In a preferred embodiment, see FIG. 12, the headwear structure 106 is trimmed by an ultrasonic cutter which fuses the free edges of the headwear structure 106 simultaneously as the trimming takes place to offer a smooth finish.

Either side of the shaped and trimmed first substrate 102 may be applied with a layer of binding agent such as adhesive to adhere it onto the second and third substrates 103 and 104 on respective sides. Alternatively, one can simply rely on the bonding between the substrates 102, 103 and 104 or that between the second and third substrate 103 and 104 resulting from the hot press to restrict the relative positions of the substrates 102, 103 and 104.

Figure 13:
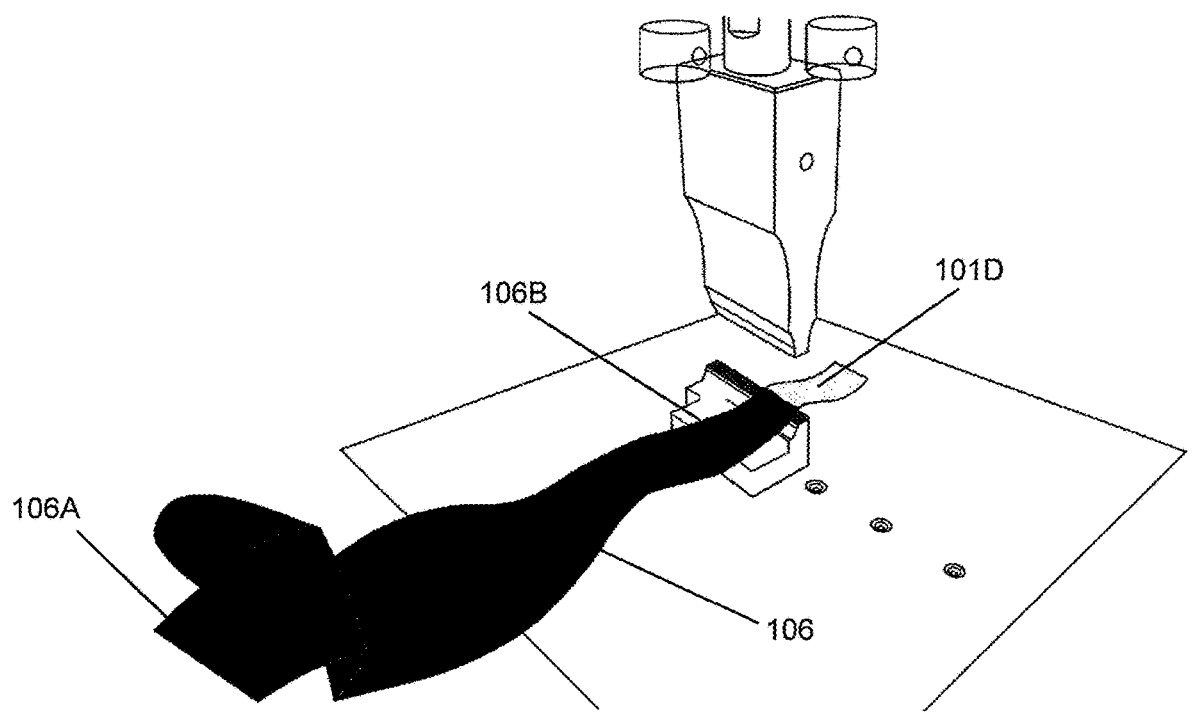
FIG. 13 is an illustrative drawing showing a step of connecting free end of the substrates in FIG. 12 by a link.

In the preferred embodiment where the headwear structure 106 has two free ends 106A and 106B, a link 101D may be used to connect the two. Usually ends of the link 101D are inserted into the respective free ends 106A and 106B between the second and third substrates 103 and 104. The two substrates 103 and 104 are not bonded to one another at the free ends 106A and 106B during hot press because an insulator is applied therebetween when the third substrate 104 is shaped to avoid the third layer 104 to come into direct contact with the second layer 103. Referring to FIG. 13, a link 101D is inserted into the free ends 106A and 106B and is then ultrasonically welded thereto. In other words, the free ends 106A and 106B are directly or indirectly connected by a solid-state weld.

Although not shown, it is possible to form a complete headwear 100 out of the three hot press steps by having a set of mold parts different from those as shown in the drawings which is only an example for purposes of illustration of an embodiment of the manufacturing of a headwear. Free ends 106A and 106B of the second and third substrates 103 and 104 may be joined when the respective substrates 103 or 104 are being shaped. All the joined ends are bonded to each other when the third substrate 104 is being shaped. Alternatively, the raw substrates 103 or 104 may be in the form of a complete loop to be inserted into the mold parts 200A and 200B for shaping which results in a looped headwear 100 for placing over the user's head. In both cases, the resulting headwear 100 is seamless.

In this particular visor cap 100, the first structure 102 extends across the visor portion 101A, the headband portion 101B and the interfaced foldline 101C. The first substrate 102 is shaped to include the foldline 101C and as the first substrate 102 has a higher deformation resistance comparing to the second and third substrates 103 and 104. The relative angular position between the visor portion 101A and the headband portion 101B on the first substrate 102 is well maintained by its own deformation resistance.

The angular relationship between the portions 101A and 101B in the second and third substrates 103 and 104 is reinforced by the presence of the shaped first substrate 102 therebetween. Moreover, the first substrate 102 is actually shaped twice, a first time independent of other substrates 103 or 104 and a second time when it is shaped with the second and third substrates 103 and 104 which contributes to maintaining of the shape of the shaped first substrate 102 and hence the other substrates 103, 104 and the overall headwear 100.

Also the visor portion 101A as well as the headband portion 101B are curved surfaces. The curvatures are again maintained by the shaped first substrate 102 which is molded twice to carry the curvatures.

Figure 14:
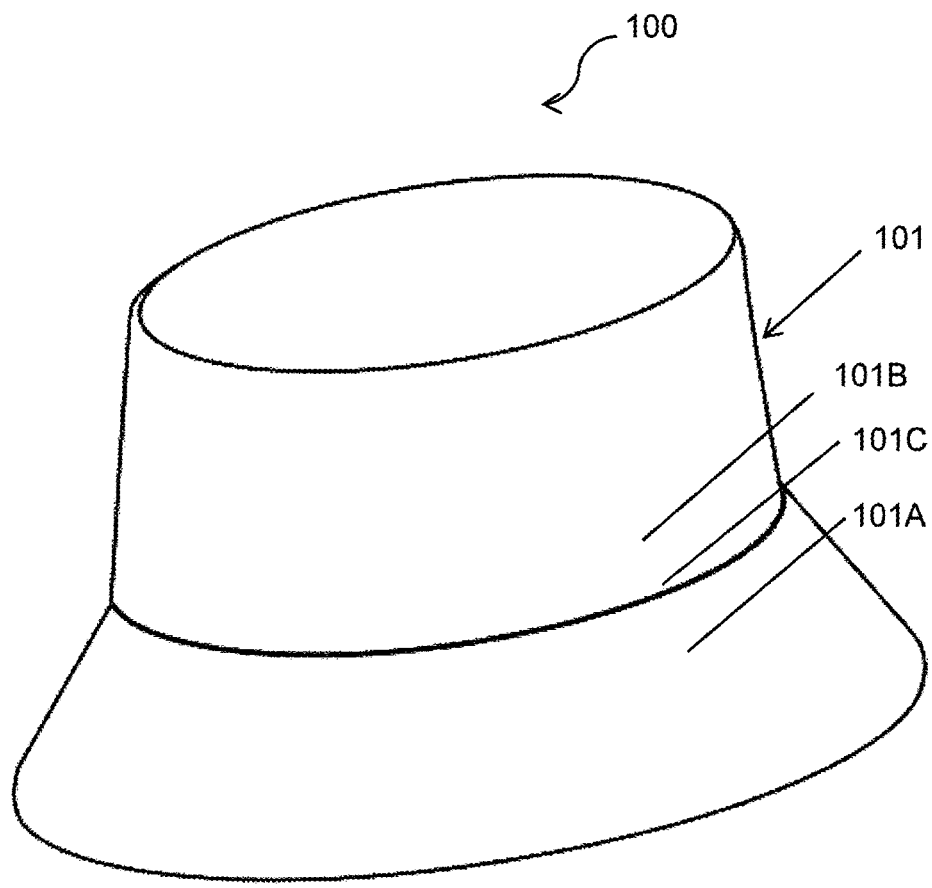
FIG. 14 is an illustrative perspective view of a further embodiment of a headwear in accordance with the invention.
Figure 15A:
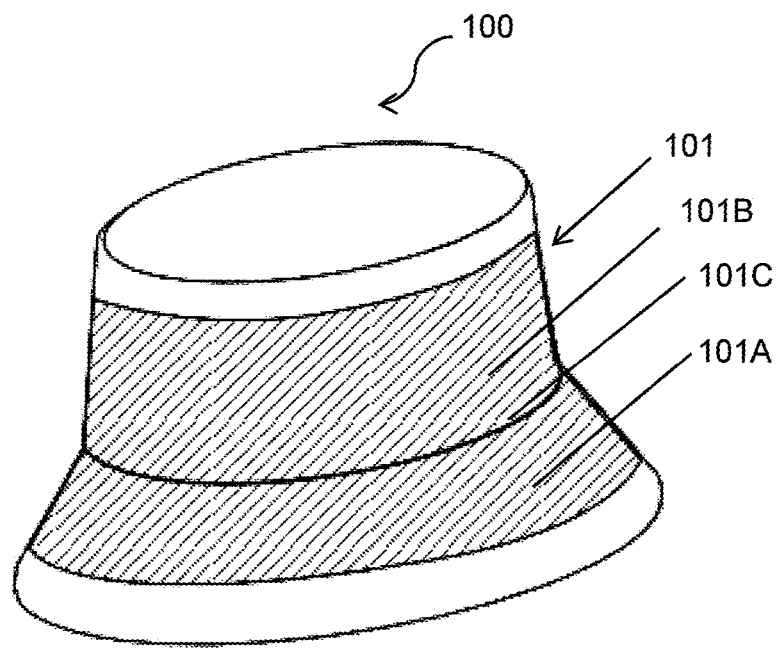
FIG. 15A is an illustrative perspective view of the headwear in FIG. 14 showing the position of a first substrate.
Figure 15B:
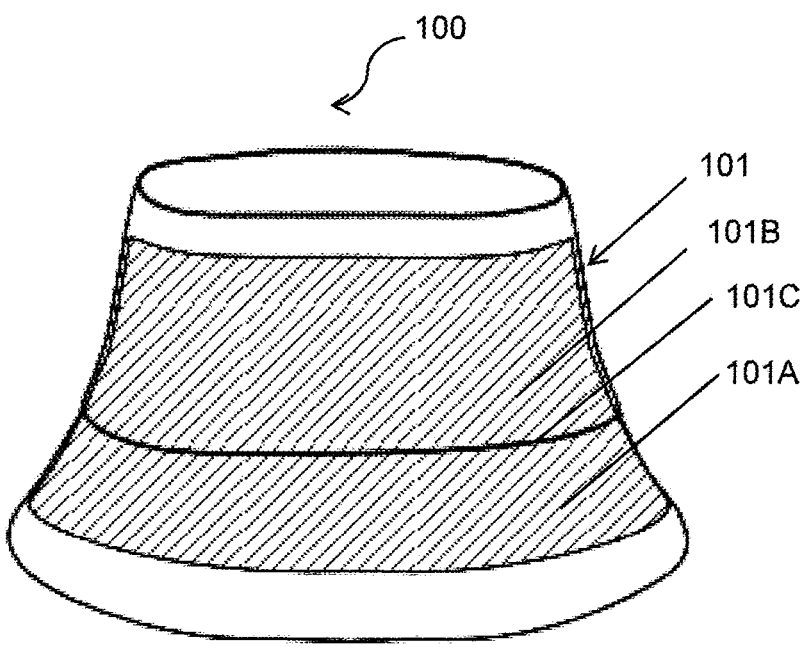
FIG. 15B is an illustrative front view of the headwear in FIG. 15A showing the position of the first substrate.
Figure 16:
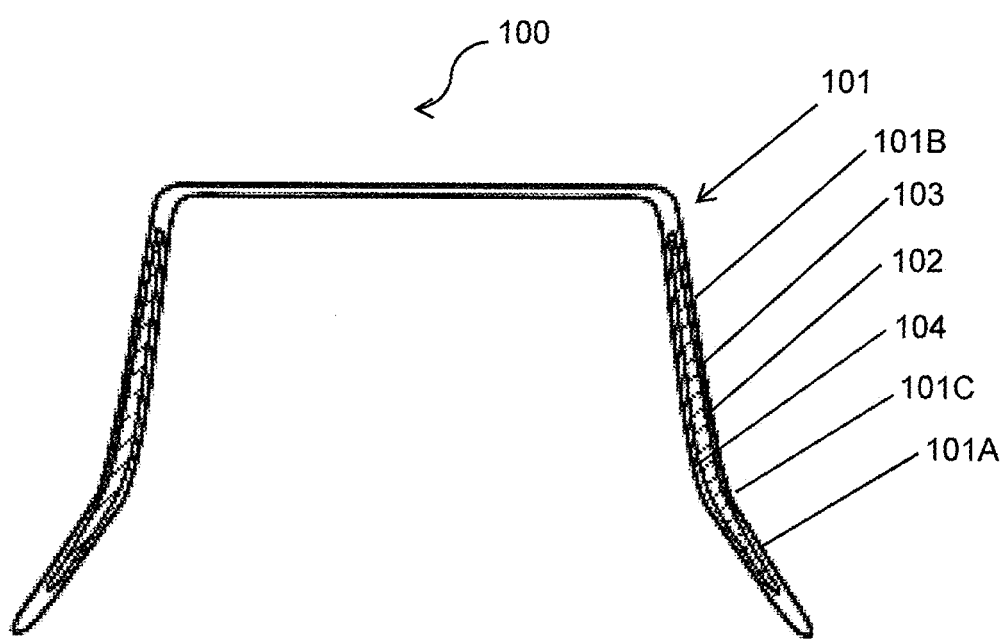
FIG. 16 is a cross-sectional view of the headwear in FIGS. 14 to 15B showing the first substrate being sandwiched between second and third substrates.
Figure 17A:
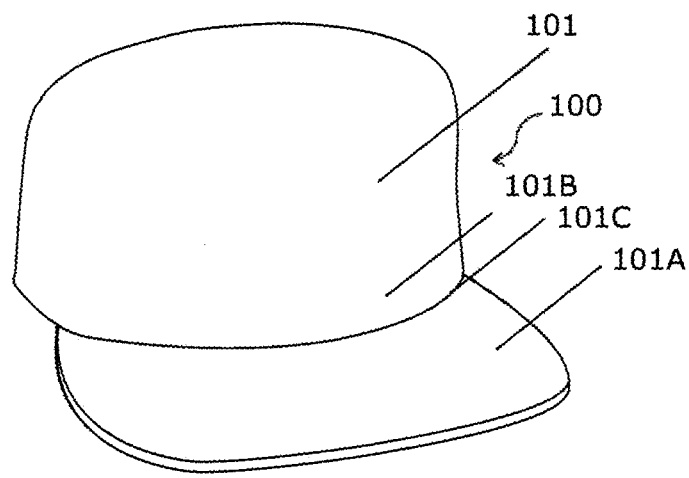
FIG. 17A is an illustrative perspective view of a further embodiment of a headwear in accordance with the invention.
Figure 17B:
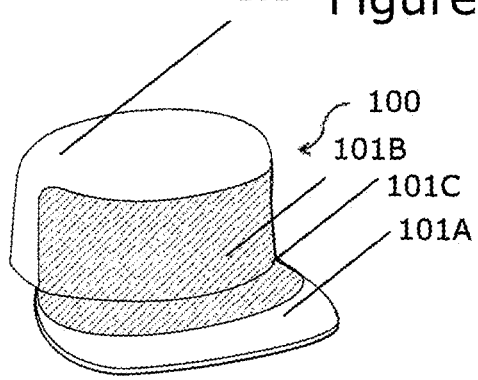
FIG. 17B is an illustrative front view of the headwear in FIG. 17A showing the position of a first substrate therein.
Figure 17C:
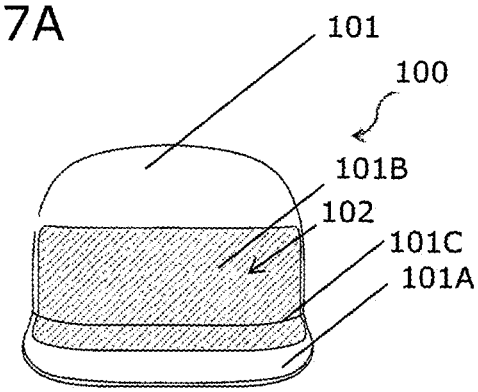
FIG. 17C is an illustrative front view of the headwear in FIG. 17A showing the position of the first substrate.
Figure 17D:
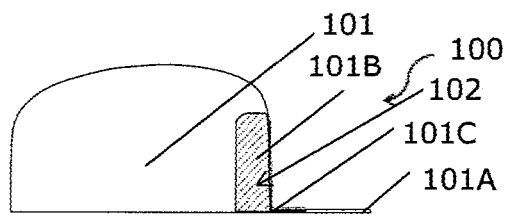
FIG. 17D is a side view of the headwear in FIGS. 17A to 17C showing the first substrate being sandwiched between second and third substrates

It is noted that headwear 100 may be in other forms including a bucket hat as shown in FIGS. 14 to 16 or a flat beam fitted cap. As can been seen in FIGS. 15A and 15B, reinforcement is required at the curvature on the visor and the headband portions 101A and 101B. The foldline 101C also requires reinforcement. Therefore, as shown in FIG. 16, the shaped first substrate 102 extends across the whole of the visor and headband portions 101A and 101B as well as across and along the foldline 101C. The bucket hat 100 is basically formed by the same manufacturing process as detailed above for making the visor cap except that a different mold 200 would be required. The resulting bucket hat 100 has a seamless finish in the form of a one-piece structure.

Referring to FIGS. 17A to D, the flat beam fitted cap 100 is reinforced at the visor portion, the headband portion 101A and 101B as well as the junction therebetween. The junction includes a foldline 101C. The shaped first substrate 102 extends across the whole of the headband portion 101B, over the foldline 101C, to part of the visor portion 101A. The main reinforcement is provided at the headband portion 101B and the foldline 101C to support the curvature on the headband portion 101B and maintain the angle between the visor portion 101A and the headband portion 101B, hence the foldline 101C. The flat beam fitted cap 100 is basically formed by the same manufacturing process as detailed above for making the visor cap or the bucket hat except that a different mold 200 would be required. The resulting flat beam fitted cap 100 has a seamless finish in the form of a one-piece structure.

Other possible embodiments of the headwear 100 are hats such as but not limited to cowboy hat, trilby, bowler, beret, fedora, panama, cloche, ivy cap, trapper and derby.

The invention has been given by way of example only, and various other modifications of and/or alterations to the described embodiment may be made by persons skilled in the art without departing from the scope of the invention as specified in the appended claims.

The invention claimed is:

1. A manufacturing method of manufacturing a headwear, comprising the steps, irrespective of order, of:
    (a) providing a mold including at least two mold parts having first and second molding surfaces which are complementarily profiled to give shape to said headwear;
    (b) shaping a first substrate in the mold resulting in the first substrate having a non-planar profile which matches at least a portion of the profile of the molding surfaces, wherein the portion of the non-planar profile comprises two surfaces interfaced by a bent, wherein the first substrate covers less than all of the molding surfaces;
    (c) shaping a second substrate in mold resulting in the second substrate having a non-planar profile which matches the profile of the molding surfaces;
    (d) overlaying the first substrate on the second substrate and matching their non-planar profile to form a combined substrate;
    (e) placing a third substrate in the mold with the combined substrate, sandwiching the first substrate; and
    (f) shaping the third substrate with the combined substrate in the mold resulting in the third substrate having a non-planar profile which matches the profile of the molding surfaces, thereby forming a seamless structure for said headwear, wherein the first substrate has a higher deformation resistance than the second and third substrates, wherein the first substrate is sandwiched between the second and third substrates to function as a supportive skeletal structure therebetween, wherein the first and second substrates include corresponding bents after shaping and the bents are matched when the second substrate overlays the first substrate to form a bent of the combined substrate, and wherein the third substrate is shaped to include a bent that correspond to the bent of the combined substrate.

2. The manufacturing method as claimed in claim 1, wherein the bents comprise a fold line.

3. The manufacturing method as claimed in claim 1, wherein the two surfaces are curved surfaces.

4. The manufacturing method as claimed in claim 1, wherein the second substrate forms a loop structure in step (c).

5. The manufacturing method as claimed in claim 1, wherein the one-piece headwear structure forms a loop in step (f).

6. The manufacturing method as claimed in claim 1, wherein the seamless headwear structure has free ends that are held together by a solid-state weld.

7. The manufacturing method as claimed in claim 1, wherein the seamless headwear structure has free ends that are held together through an adjustable link.

8. The manufacturing method as claimed in claim 1, wherein the seamless headwear structure is a lamination with the substrates held together at least partially by a solid-state weld.

9. The manufacturing method as claimed in claim 1, wherein the seamless headwear structure is a lamination with the substrates held together at least partially by a binding agent.

10. The manufacturing method as claimed in claim 9, wherein the binding agent comprise an adhesive.

11. The manufacturing method as claimed in claim 1 further comprising a step (g) of fusing a raw edge of the seamless headwear structure by a solid-state weld after step (f).

12. The manufacturing method as claimed in claim 11, wherein the step (g) is conducted by way of ultrasonic welding.

13. The manufacturing method as claimed in claim 1 further comprising the step of trimming a shaped first substrate into a desirable contour.

14. The manufacturing method as claimed in claim 1 further comprising the step of trimming a shaped second substrate into a desirable contour.

15. The manufacturing method as claimed in claim 1 further comprising the step of trimming a shaped third substrate into a desirable contour.

16. The manufacturing method as claimed in claim 1 further comprising the step of trimming a shaped seamless headwear structure into a desirable contour.

17. The manufacturing method as claimed in claim 16, wherein the step of trimming includes simultaneously trimming and fusing of a trimmed edge of the shaped seamless headwear structure.

18. The manufacturing method as claimed in claim 1, wherein a heat press machine is used in carrying out the method.

19. The manufacturing method as claimed in claim 17, wherein the step of trimming and fusing is conducted by way of an ultrasonic cutter.

20. The manufacturing method as claimed in claim 1, wherein the mold comprises a metal mold.

21. The manufacturing method as claimed in claim 1, wherein the first substrate comprises foam that has a higher deformation resistance than the second and third substrates to function as a supportive structure therebetween.

22. The manufacturing method as claimed in claim 21, wherein the foam comprises polypropylene and polyurethane and the foam is made from a greater proportion of polypropylene than polyurethane.

23. The manufacturing method as claimed in claim 1, wherein the mold is useful in shaping the first, second and third substrates.

24. The manufacturing method as claimed in claim 1, wherein the mold remains in the closed position for one hundred and fifty to two hundred seconds in each of steps (b), (c) and (f).

25. The manufacturing method as claimed in claim 1, wherein each layer of substrate is a seamless non-planar structure.

26. The manufacturing method as claimed in claim 1, wherein the non-planar profile of step (c) includes a portion of the non-planar profile of step (b).

27. The manufacturing method as claimed in claim 1, wherein the non-planar profile of step (c) has a periphery that encloses and surrounds the non-planar profile of step (b).

28. A manufacturing method of making a headwear, comprising the steps of:
   (a) providing a mold including at least two mold parts having first and second molding surfaces which are complementarily profiled to give shape to said headwear;
   (b) shaping a first substrate in the mold resulting in the first substrate having a non-planar profile which matches at least a portion of the profile of the molding surfaces;
   (c) trimming the first substrate to a desired profile;
   (d) shaping a second substrate in the mold resulting in the second substrate having a non-planar profile which matches the profile of the molding surfaces, including the portion mentioned in step (b);
   (e) overlaying trimmed first substrate on the second substrate and matching their non-planar profile to form a combined substrate;
   (f) placing a third substrate in the mold with the combined substrate to sandwich the first substrate; and
   (g) shaping the third substrate with the combined substrate in the mold resulting in the third substrate having a non-planar profile which matches the profile of the molding surfaces;
   (h) trimming the second and third substrates simultaneously to thereby forming a seamless headwear structure.

29. A headwear manufactured by the method as claimed in claim 1, wherein the headwear is a hat.

30. A seamless headwear manufactured by the method as claimed in claim 1.

31. The manufacturing method as claimed in claim 22, wherein the foam that is made from a greater proportion of polypropylene than polyurethane is covered by a layer of textile after the foam is formed and before it is used for the manufacturing of the headwear.

* * * * *